United States Patent [19]

Tonelli et al.

[11] Patent Number: 5,410,010
[45] Date of Patent: Apr. 25, 1995

[54] USE OF FLUORINATED POLYURETHANES FOR THE TREATMENT OF FILMS OR SHEETS MADE OF CELLULOSE, GRAPHITE, MICA, KAOLIN, LEATHER AND SIMILAR NATURAL MATERIALS

[75] Inventors: Claudio Tonelli, Concorezzo; Giovanni Simeone, Milan, both of Italy

[73] Assignee: Ausimont S.p.A., Milan, Italy

[21] Appl. No.: 922,164

[22] Filed: Jul. 29, 1992

[30] Foreign Application Priority Data

Aug. 2, 1991 [IT] Italy ............................. MI91A2160

[51] Int. Cl.⁶ ............... C08G 18/50; C08G 18/75; C08G 18/76; C08G 18/77; C09J 175/08
[52] U.S. Cl. .......................... 528/70; 528/10; 528/25; 528/26; 528/28; 528/29; 528/33; 528/34; 528/43; 528/60; 528/66; 528/73; 528/74; 528/76; 528/77; 528/905; 427/385.5; 427/387; 427/389; 427/389.9; 427/392; 427/393.6; 428/423.1; 428/423.4; 428/425.1; 428/425.5; 156/329; 156/331.4; 156/331.7
[58] Field of Search ............. 528/10, 25, 26, 28, 528/29, 33, 34, 43, 60, 66, 70, 73, 74, 76, 77, 905; 428/423.1, 423.4, 425.1, 425.5; 427/385.5, 387, 389.9, 389, 392, 393.6; 156/329, 331.4, 331.7

[56] References Cited

U.S. PATENT DOCUMENTS

| | | | |
|---|---|---|---|
| 3,642,705 | 2/1972 | Zollinger | 528/70 |
| 3,671,497 | 6/1972 | Low et al. | 528/70 |
| 3,755,265 | 8/1973 | Fletcher et al. | 528/70 |
| 3,972,856 | 8/1976 | Mitsch et al. | 528/70 |
| 4,094,911 | 6/1978 | Mitsch et al. | 568/615 |
| 4,699,969 | 10/1987 | Re et al. | 528/70 |
| 4,704,420 | 11/1987 | Federici et al. | 528/65 |
| 4,782,130 | 11/1988 | Re et al. | 528/70 |
| 4,842,939 | 6/1989 | Scarati et al. | 428/421 |
| 4,863,986 | 9/1989 | Re et al. | 528/70 |
| 5,026,814 | 6/1991 | Re et al. | 528/70 |
| 5,185,421 | 2/1993 | Cohen et al. | 528/70 |
| 5,189,135 | 2/1993 | Cozzi et al. | 528/70 |
| 5,204,441 | 4/1993 | Baum et al. | 528/70 |
| 5,214,121 | 5/1993 | Mosch et al. | 528/70 |
| 5,332,798 | 7/1994 | Ferreri et al. | 528/66 |
| 5,350,795 | 9/1994 | Smith et al. | 528/70 |

FOREIGN PATENT DOCUMENTS

| | | |
|---|---|---|
| 0329271 | 8/1989 | European Pat. Off. |
| 0359272 | 3/1990 | European Pat. Off. |
| 0359273 | 3/1990 | European Pat. Off. |
| 903446 | 1/1972 | Italy |
| 1309401 | 3/1973 | United Kingdom |
| 1309402 | 3/1973 | United Kingdom |

OTHER PUBLICATIONS

Chemical Abstracts. vol. 70, No. 22, 1969, Abstract No. 97293d, Hollander et al. "Highly Fluorinated Polyurethanes".

Primary Examiner—John Kight, III
Assistant Examiner—Rabon Sergent
Attorney, Agent, or Firm—Maurice B. Stiefel; Arthur Mann

[57] ABSTRACT

A class of cross-linked fluorinated polyurethanes, which can be used for protecting and reinforcing coatings on films, sheets, laminates and similar thin structures made of cellulose, graphite, mica, kaolin, leather etc. as well as for adhesive and reinforcing material in multi-layer structures made of films, sheets, laminates and similar thin structures made of graphite, mica, kaolin, etc. These polyurethanes can be obtained starting from the following components:

(A) a polyisocyanate consisting of a perfluoropolyether chain bound to the —NCO terminal groups through an aromatic or cycloaliphatic radical; and (B) a polyol consisting of a perfluoropolyether chain bound to the —OH terminal groups through an aromatic or cycloaliphatic radical.

6 Claims, No Drawings

USE OF FLUORINATED POLYURETHANES FOR THE TREATMENT OF FILMS OR SHEETS MADE OF CELLULOSE, GRAPHITE, MICA, KAOLIN, LEATHER AND SIMILAR NATURAL MATERIALS

BACKGROUND OF THE INVENTION

This invention relates to the use of fluorinated polyurethanes, endowed with a particular combination of properties, for the treatment of films, sheets and similar thin structures made of natural materials such as cellulose, graphite, mica, leather and kaolin.

Fluorinated polyurethanes containing polyoxyperfluoro alkylenic blocks alternating with hydrogenated rigid segments are disclosed in Italian Patent No. 903,446, U.S. Pat. No. 4,782,130 and European Patent Applications No. 359,272 and 359,273.

Said polyurethanes are used as elastomers for tightness systems employed in very hard operating conditions, characterized by an aggressive environment and with very low temperatures.

The principal aim of the above Italian Patent No. 903,446 is the synthesis of perfluoropolyether prepolymers containing hydroxyl terminal groups for the preparation of cross-linked polyurethanes, endowed with a very low Tg. Suitable polyisocyanates are the conventional hydrogenated aliphatic, or aromatic ones and the fluorinated aliphatic ones.

When the above said isocyanates are employed, problems of homogeneity during the synthesis are often encountered. Moreover, the structures disclosed in the above Italian Patent do not allow to obtain products endowed with sufficient mechanical properties. In particular, the tensile strength is usually less than 1 MPa.

The aim of the other three above mentioned documents is the obtainment of materials having improved mechanical properties. This is obtained by means of a block structure constituted of flexible blocks of perfluoropolyether chains and rigid segments constituted of a hydrogenated diol or polyol, an hydrogenated diisocyanate and, optionally, an hydrogenated diamine.

The thus obtained polyurethanes are elastomers having a high elastic modulus and, therefore, endowed with a quite high rigidity, which is useful in some application but undesired in others. In the preparation of these polyurethanes, in view of the contemporary presence of fluorinated prepolymers and hydrogenated monomers having low reciprocal compatibilities, it is necessary to use mixtures of particular solvents, one of which is a solvent of the fluorinated substances and the other of the hydrogenated ones.

SUMMARY OF THE INVENTION

It has now been found that a particular class of fluorinated polyurethanes shows a combination of properties which renders them particularly suitable for the above described utilization.

Said properties comprise:
an excellent elasticity even at very low temperatures, due to a very low Tg, usually lower than $-100°$ C.;
a very good combination of mechanical properties in view of the above described utilization and, particularly, high tensile strength and elongation at break together with not too high hardness and elastic modulus, so that the polymer is endowed with a very good flexibility together with a high mechanical strength;
very good chemical resistance, in particular toward acids, bases, oxidants, solvents, water and steam;
very good film-making and adhesive properties;
excellent dielectric properties;
absence of residual tackiness.

Therefore, an object of the present invention is to provide a class of fluorinated polyurethanes endowed with the above described optimal combination of properties for their utilization as protective and reinforcing coatings on films, sheets, laminates and similar thin structures made of cellulose, graphite, mica, kaolin, leather and similar natural materials which are fragile and/or sensitive to external agents, and for their utilization as adhesive and reinforcing material for multi-layer structures made of films, sheets, laminates and similar thin structures made of graphite, mica, kaolin and similar fragile natural materials.

DETAILED DESCRIPTION OF THE INVENTION

This and still other objects are obtained by employing fluorinated polyurethanes obtainable starting from the following components:

(A) at least one fluorinated diisocyanate or polyisocyanate, having number average molecular weight ranging from 500 to 7000, of the following formula:

$$[(OCN)_nR]_x—(Z^1)_d—[R(NCO)_q]_z \quad (I)$$

wherein $Z^1$ is a bivalent or trivalent radical selected from the group consisting of —CONH—, —CH$_2$—, —CH$_2$O—, —CH$_2$OCH$_2$—, —O—, —CH$_2$OSO$_2$—, —CH$_2$O—CONH, —CH$_2$O(CH$_2$CH$_2$O)$_b$—,  H$_2$O(CH$_2$CH$_2$O)$_b$—CO—NH— (wherein b is an integer ranging from 1 to 10, and preferably from 1 to 3),

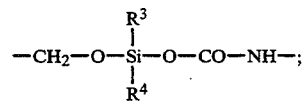

(wherein $R^3$ and $R^4$, same or different, are alkyl radicals having from 1 to 4 carbon atoms),

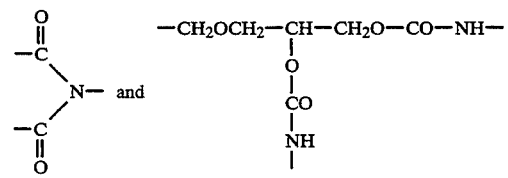

R is a divalent or polyvalent aromatic or cycloaliphatic radical having from 6 to 20 carbon atoms; provided that when $Z^1$ is the radical

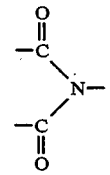

it can only be bound to an aromatic radical;
d is 0 or 1;

z is 1 when d is 0 or when $Z^1$ is a divalent radical, and is 2 when $Z^1$ is a trivalent radical;

(n·z) and (q·z), same or different, are integers ranging from 0 to 2;

(n·z)+(q·z) is an integer ranging from 2 to 4;

Q is a perfluoropolyether or fluoropolyether chain selected from the group consisting of:

(1°) 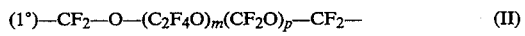 (II)

wherein the ($C_2F_4O$) and ($CF_2O$) units are randomly distributed along the chain and m/p ranges from 0.2 to 2;

(2°) 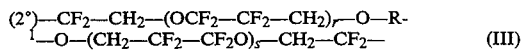 (III)

wherein $R^1$ is a fluoroalkylenic radical containing from 1 to 10 carbon atoms and r/s ranges from 0.8 to 1.2;

(3°) 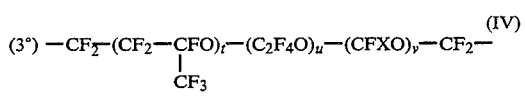 (IV)

wherein the units

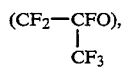

($C_2F_4O$) and (CFXO) are randomly distributed along the chain, X is F or $CF_3$, t/u ranges from 0.6 to 2.0, u/v is higher than 10;

(4°) 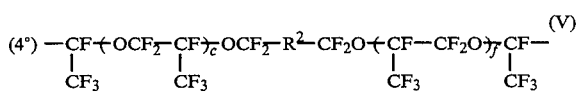 (V)

wherein $R^2$ is a perfluoroalkylenic radical containing from 1 to 10 carbon atoms, and c/f ranges from 0.8 to 1.2; and (B) at least one fluorinated diol or polyol, having number average molecular weight ranging from 400 to 7000, of the following formula:

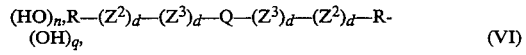 (VI)

wherein $Z^2$ and $Z^3$, same or different, are bivalent radicals selected from the group consisting of —CONH—, —$CH_2$—, $CH_2O$—, —$CH_2OCH_2$—, —O—, —$CH_2OSO_2$—, —$CH_2O$—CONH—, —$CH_2(OCH_2CH_2)_g$— (wherein g is an integer ranging from 1 to 10, and preferably from 1 to 3),

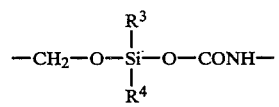

(wherein $R^3$ and $R^4$, same or different, are alkyl radicals having from 1 to 4 carbon atoms), or $Z^2$ and $Z^3$ together represent the radical —CHOH—$CH_2OCH_2$—; R, Q and d have the above indicated meaning;

n' and q', same or different, are integers ranging from 0 to 2;

n'+and q' has a value ranging from 2 to 4;

(n·z) (of component A)+(q·z) (of component A)+n'+q' has a value ranging from 5 to 8, and preferably of at least 6.

These new fluorinated polyurethanes are endowed with a cross-linked structure as result from the fact that the sum of the indexes (n·z)+(q·z)+n'+q' has a value ranging from 5 to 8.

Fluorinated diisocyanates and polyisocyanates of formula (I) are per se known. In particular, said compounds, together with the method for their preparation starting from alcohols, acids, esters and acyl halides, are disclosed in the U.S. Pat. No. 4,094,911.

Fluorinated diols and polyols having formula (VI) are per se known as well. In particular, said compounds and the method for their preparation are disclosed in the above mentioned Italian Patent No. 903,446.

The fluorinated polyurethanes utilized in the present invention commonly comprise only one fluorinated di- or polyisocyanate or only one fluorinated diol or polyol.

The fluorinated polyurethanes utilized in the present invention are endowed with the above described combination of properties that makes them particularly suitable for their utilization as protective and reinforcing coatings of films, sheets, laminates and similar thin structures made of mica, graphite, paper, kaolin, leather and similar natural materials which are fragile and/or sensitive to external agents, and for their utilization as adhesive and reinforcing material for multi-layer structures made of mica, graphite, kaolin and similar fragile natural materials.

In the starting polyisocyanates and polyols the R radical is divalent or polyvalent. When it is polyvalent, it is preferably trivalent.

Among preferred R radicals, the following may be cited:

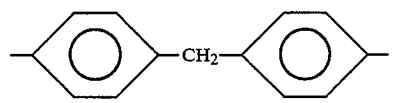

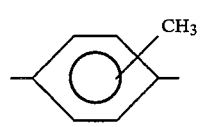

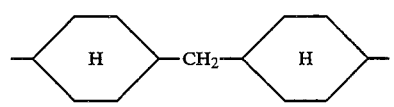

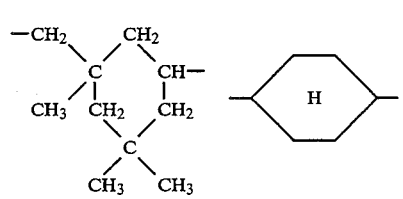

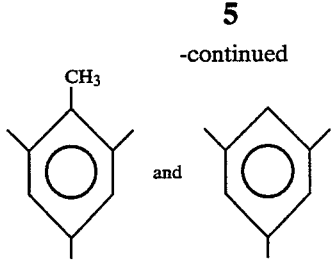 and

The possible free valences of R radicals, namely those which are not bound to $Z^1$, $Z^2$ or $Z^3$ radicals or to functional group —NCO or —OH, are bound to hydrogen atoms. In the perfluoropolyether chain of formula (II), the m/p ratio is preferably comprised between 0.5 and 1.2.

In the fluoropolyether chain of formula (III), $R^1$ is preferably a fluoroalkylene radical containing from 1 to 4 carbon atoms.

In the perfluoropolyether chain of formula (V), $R^2$ is preferably a perfluoroalkylenic radical containing from 1 to 4 carbon atoms.

The preparation of the fluorinated polyurethane is performed directly on the material to be coated. The two components are mixed and spread on the material by means of conventional techniques such as, for instance, coating with pitch, sputtering or immersion of the material in the mixture of the two components. The reaction may be performed without the employment of a catalyst, for instance by heating at 100°–150° C. for a time of 2–24 hours. The employ of a catalytic system permits to operate at lower temperatures, for instance at 20°–80° C., and for shorter times. Catalysts which may be employed are those commonly used in the preparation of polyurethanes. Examples of said catalysts are tin complexes, such as tin dibutyl dilaurate, iron complexes, such as iron acetylacetonate, and tertiary amines.

The equivalent ratio NCO/OH in the starting mixture has a value which usually ranges from 1.00 to 1.05. Preferably, said ratio is 1.00.

The fluorinated polyurethanes used in the present invention may be employed to obtain protective and reinforcing coatings or as adhesive and reinforcing material for multi-layer structures. In particular, said polyurethanes can drastically improve the mechanical resistance and reduce crackings due to bendings and other stresses in thin expanded graphite or mica sheets, therefore allowing an easier workability.

In fact, it is known that thin graphite sheets (having thickness even lower than 0.3 mm) are obtained by hot sintering, by calendering expanded graphite particles. However, the material obtained by said working system, while endowed with very good thermic inertness, has an insufficient resistance toward mechanical solicitations as well as toward chemical oxidants.

Therefore, in the preparation of graphite packings having a complex shape, a breaking of the packing is not infrequent.

Said drawbacks can be overcome by means of the utilization of the polyurethanes of the present invention.

Similar problems are encountered for mica sheets that find a large utilization where it is requested a combination of properties of thermal and electrical insulation together with the feasibility of molded or cut pieces with an extremely accurate dimensional control.

Said drawbacks too can be overcome by means of the polyurethanes of the present invention.

Furthermore, in a lot of applications, special products made of mica ("built-up mica") are employed, which are constituted of sheets or plates (tables) made of superposed layers of mica alterned with a suitable polymeric binder by means of a process under heat and pressure Also in this case, the use of the polyurethane binders of the present invention, having very good dielectric, flexibility and adhering properties, results particularly advantageous.

In the preparation of special paper (cellulose) sheets, the need to improve resistance to external agents, such as water, steam, greases, oils and chemical agents in general, is not infrequent.

In the known art, superficial treatments with materials having a barrier effect are described. In particular, the use of waxes or parafines applied in their melted form is described. Furthermore, the use is described of polymers such as polyethylene which, even giving more flexible films than those obtained with waxes and parafines, in some utilization show insufficient elasticity at low temperatures and low resistance to solvents.

The following examples are supplied for purely illustrative and not limiting purpose.

EXAMPLE 1

50 g of component (A) of formula (VII) having equivalent weight of 1219, corresponding to 41 meq of NCO, were fed in a 250 ml flask equipped with mechanical stirrer. Afterwards, 22 g of component (B) of formula (VIII) having equivalent weight of 537, corresponding to 41 meq of OH, were added under stirring. The vessel was kept under stirring for 2 minutes at 60° C. under vacuum. Then its contents was transferred in a mold and the polymerization was completed in a mould at 130° C. for 7 hours.

Component (A) has the formula:

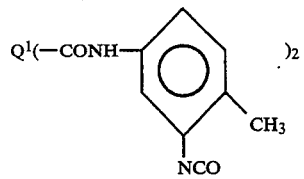

(VII)

wherein $Q^1$ is a perfluoropolyether chain according to formula (II) with m/p ratio of 1.0 and numeric average molecular weight of 2000.

Component (B) has the formula:

$$Q^1-(CH_2OCH_2-CHOH-CH_2OH)_2 \quad (VIII)$$

wherein $Q^1$ has the above said meaning.

The thus obtained sheet has been characterized mechanically and chemical/physically. The results are the following:

| | |
|---|---|
| Hardness (Shore A) (ASTM D2240) | 39 |
| Brittle point (ASTM D746) | −114° C. |
| Elongation at break at 23° C. (ASTM D1708) | 337% |
| 20% modulus at 23° C. (ASTM D1708) | 17.5 Kg/cm² |
| 100% modulus at 23° C. (ASTM D1708) | 8.0 Kg/cm² |
| Tensile strenght at 23° C. (ASTM D1708) | 38 Kg/cm² |

| | |
|---|---|
| Contact angle with water (at room temperature) | 92° |
| Contact angle with hexadecane | 55° |
| Volume resistivity (ASTM D257) | >10$^{13}$ Ohm. cm |
| Dielectric rigidity (ASTM D149) | 26.4 KV/mm |
| Dielectric constant (ASTM D150) | 4.4 |
| Specific weight | 1.722 |

The same polymer is applied on an expanded graphite sheet having thickness of 0.3 mm by means of film-spreading bar during the "pot life" period, that is when the viscosity of the system (lower than 10,000 cSt) allows its application.

The polymeric film is completely polymerized in stove at 150° C. for an hour, obtaining a coating whose thickness is 25 micron.

Three points flexion tests according to ASTMD790 have been carried out on the treated sheet and on the non-treated one. A maximum stress of 0.40 and 0.22N respectively was observed.

EXAMPLE 2

50 g of component (A) of formula (IX) having equivalent weight of 1174, corresponding to 43 meq of NCO, have been reacted with 23.1 g of component (B) of formula (VIII) (see example 1) having equivalent weight of 537, corresponding to 43 meq of OH.

Component (A) has the formula:

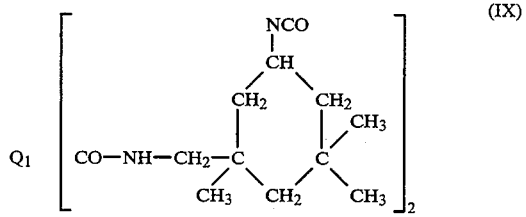

wherein $Q^1$ has the same meaning as indicated in Example 1.

The vessel was kept under stirring for 2 minutes at 60° C. under vacuum. Then its contents was transferred in a mould and the polymerization was completed in a press at 130° C. for 7 hours.

The thus obtained elastomer has the following characteristics:

| | |
|---|---|
| Hardness (Shore A) | 41 |
| Brittle point | −113° C. |
| Elongation at break at 23° C. | 350% |
| 20% modulus at 23° C. | 19.0 Kg/cm$^2$ |
| 100% modulus at 23° C. | 9.1 Kg/cm$^2$ |
| Tensile strenght at 23° C. | 41.2 Kg/cm$^2$ |
| Contact angle with water | 94° |
| Contact angle with hexadecane | 61° |

Following the procedure of Example 1, the polymer is applied on mica sheets having thickness of 0.05 mm.

The polymeric film is completely polymerized in stove at 130° C. for 7 hours, obtaining a coating whose thickness is 20 micron. A material is obtained which has improved resistance to mechanical stresses, particularly to bending.

A similar deposition was made on a paper sheet having thickness of about 0.1 mm. In order to accelerate the polymerization and to reduce the temperature, 100 ppm of tin dibutyl dilaurate (referred to the mixture of diisocyanate and polyol) was added. Thus, after 5 hours at 80° C. the polymerization of the coating was complete.

A sample of the so treated paper, a reference non-protected sample and another reference sample treated with a siliconic coating, are treated with H$_2$SO$_4$ at 96%. The first sample, after 20 minutes, shows only a slight swelling, while the other two samples underwent a total attack of the paper which is completely dissolved from the acid action. A similar result was achieved after 20 minutes of treatment with NaOH at 50%.

Finally, a treatment in H$_2$SO$_4$ at 3% at 20° C. for 48 hours showed that the paper protected with the fluorinated coating resulted unaltered. On the contrary, a reference non-treated sample underwent a total attack with further total dissolution, giving rise to a cellulosic suspension.

EXAMPLE 3

40 g of component (A) having the following formula:

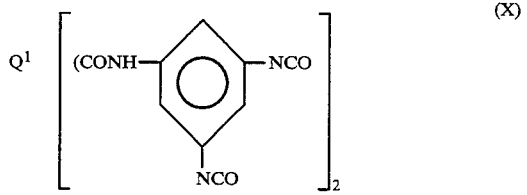

wherein $Q^1$ has the same meaning as in example 1, having equivalent weight of 1202, corresponding to 66 meq of NCO, was reacted with 71 g of diol of the formula:

$$Q^1\text{—}(CH_2OCH_2\text{—}CH_2OH)_2 \qquad (XI)$$

wherein $Q^1$ has the same meaning of example 1, having equivalent weight of 1075, corresponding to 66 meq of OH.

The mixture of polyisocyanate and diol was spreaded on a graphite sheet having thickness of 0.3 mm and the sheet was heated in stove at 100° C. for 2 hours. A polymeric coating is obtained having thickness of 20 micron. The obtained elastic film has elongation at break of 250%, very good adhesion properties (100% cross cut test, according to ASTMD3359) and is resistent to hydrolysis.

What is claimed is:

1. A method for the preparation of a protective coating on films, sheets or laminates made of cellulose, graphite, mica, kaolin, or leather, said method comprising forming as the coating a fluorinated polyurethane which is obtained by combining the following components:

(A) at least one fluorinated diisocyanate or polyisocyanate, having number average molecular weight ranging from 500 to 7000, of the following formula:

$$[(OCN)_nR]_z\text{—}(Z^1)_d\text{—}Q\text{—}(Z^1)_d\text{—}[R(NCO)_q]_z \qquad (I)$$

wherein $Z^1$ is a divalent or trivalent radical selected from the group consisting of —CONH—, —CH$_2$—, —CH$_2$O—, —CH$_2$OCH$_2$—, —O—, —CH$_2$OSO$_2$—, —CH$_2$O—CONH—, —CH$_2$O(CH$_2$CH$_2$O)$_b$—, —CH$_2$O(CH$_2$CH$_2$O)-

$_b$—CO—HN—(wherein b is an integer ranging from 1 to 10),

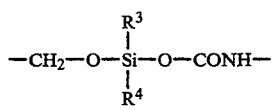

(wherein $R^3$ and $R^4$, same or different, are alkyl radicals having from 1 to 4 carbon atoms),

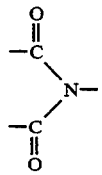

and

—CH$_2$OCH$_2$—CH—CH$_2$O—CO—NH—;
 |
 O
 |
 CO
 |
 NH

R is a divalent or polyvalent aromatic or cyctoaliphatic radical having from 6 to 20 carbon atoms; provided that when $Z^1$ is the radical

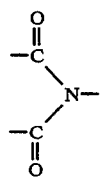

it can only be bound to an aromatic radical;
d is 0 or 1;
z is 1 when d is 0 or when $Z^1$ is a bivalent radical, and is 2 when $Z^1$ is a trivalent radical;
(n·z) and (q·z), same or different, are integers ranging from 0 to 2;
(n·z)+(q·z) is an integer ranging from 2 to 4;
Q is a perfluoropolyether or fluoropolyether chain selected from the group consisting of:

(1°) —CF$_2$—O—(C$_2$F$_4$O)$_m$(CF$_2$O)$_p$—CF$_2$— (II)

wherein the (C$_2$F$_4$O) and (CF$_2$O) units are randomly distributed along the chain and m/p ranges from 0.2 to 2;

(2°) —CF$_2$—CH$_2$—(OCF$_2$—CF$_1$—CH$_2$)$_r$—O—R$^1$—O—(CH$_2$—CF$_2$CF$_2$O)$_s$—CH$_2$—CF$_2$— (III)

wherein $R^1$ is a fluoroalkylenic radical containing from 1 to 10 carbon atoms and r/s ranges from 0.8 to 1.2;

(3°) —CF$_2$—(CF$_2$—CFO)$_t$—(C$_2$F$_4$O)$_u$—(CFXO)$_v$—CF$_2$— (IV)
              |
              CF$_3$ wherein the units (CF$_2$—CFO),
 |
 CF$_3$ (C$_2$F$_4$O) and (CFXO) are randomly distributed along the chain; X is F or CF$_3$, t/u ranges from 0.6 to 2.0, u/v is higher than 10; and (4°) —CF$\overline{\phantom{x}}$(OCF$_2$—CF)$_c$OCF$_2$—R$^2$—CF$_2$O$\overline{\phantom{x}}$(CF—CF$_2$O)$_f$CF— (V)
        |                          |              |
        CF$_3$     CF$_3$          CF$_3$         CF$_3$ wherein $R^2$ is a perfluoroalkylenic radical containing from 1 to 10 carbon atoms, and c/f ranges from 0.8 to 1.2; and (B) at least one fluorinated diol or polyol, having number average molecular weight ranging from 400 to 7000, of the following formula:

(HO)$_n$,
R—(Z$^2$)$_d$—(Z$^3$)$_d$—Q—(Z$^6$)$_d$—(Z$^2$)$_d$—R(OH)$_q$, (VI)

wherein $Z^2$ and $Z^3$, same or different are divalent radicals selected from the group consisting of —CONH—, —CH$_2$—, —CH$_2$O—, —CH$_2$OCH$_2$—, —O—, —CH$_2$OSO$_2$—, —CH$_2$O—CONH—, —CH$_2$(OCH$_2$CH$_2$)$_g$—(wherein g is an integer ranging from 1 to 10), and

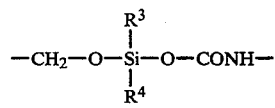

(wherein $R^3$ and $R^4$, same or different, are alkyl radicals having from 1 to 4 carbon atoms),
or $Z^2$ and $Z^3$ together represent the radical —CHOH—CH$_2$OCH$_2$—;
R, Q and d have the above indicated meaning;
n' and q', same or different, are integers ranging from 0 to 2;
n'+q' has a value ranging from 2 to 4;
(n·z) (of component A)+(q·z) (of component A)+n'+q' has a value ranging from 5 to 8.

2. The method according to claim 1, wherein the radical R is selected from the group consisting of:

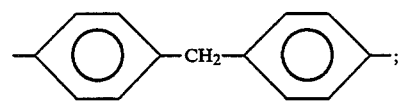

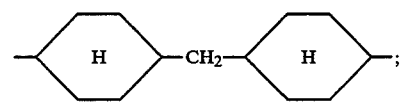

-continued

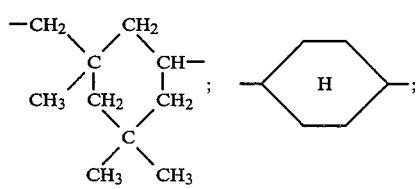

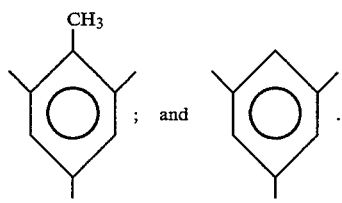

3. The method according to claim 1, wherein a mixture of said components (A) and (B) is polymerized on said films, sheets or laminates.

4. A method for the preparation of a reinforced multi-layer structure made of films, sheets, or laminates made of graphite, mica, or kaolin, said method comprising forming as an adhesive and reinforcing material for said multi-layer structure a fluorinated polyurethane which is obtained by combining components (A) and (B) of claim 1.

5. The method according to claim 4, wherein the radical R is selected from the group consisting of:

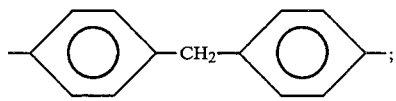

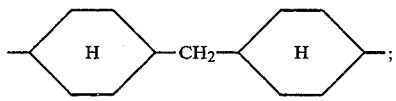

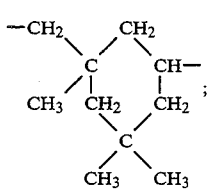

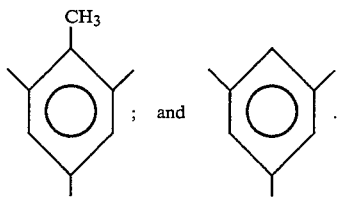

6. The method according to claim 4, wherein said multi-layer structure is prepared by placing a mixture of the components (A) and (B) between each of the layers of said multi-layer structure and allowing said mixture to polymerize in situ.

* * * * *

UNITED STATES PATENT AND TRADEMARK OFFICE
CERTIFICATE OF CORRECTION

PATENT NO. : 5,410,010

DATED        : April 25, 1995

INVENTOR(S): Claudio Tonelli et al.

It is certified that error appears in the above-identified patent and that said Letters Patent is hereby corrected as shown below:

| Column | Line  | Delete         | Insert           |
|--------|-------|----------------|------------------|
| 9      | 28-29 | "cyctoaliphatic" | --cycloaliphatic-- |

Signed and Sealed this

Nineteenth Day of November, 1996

Attest:

BRUCE LEHMAN

Attesting Officer

Commissioner of Patents and Trademarks